(Model.)
H. N. CARPENTER.
SPECTACLES.
No. 265,916. Patented Oct. 10, 1882.
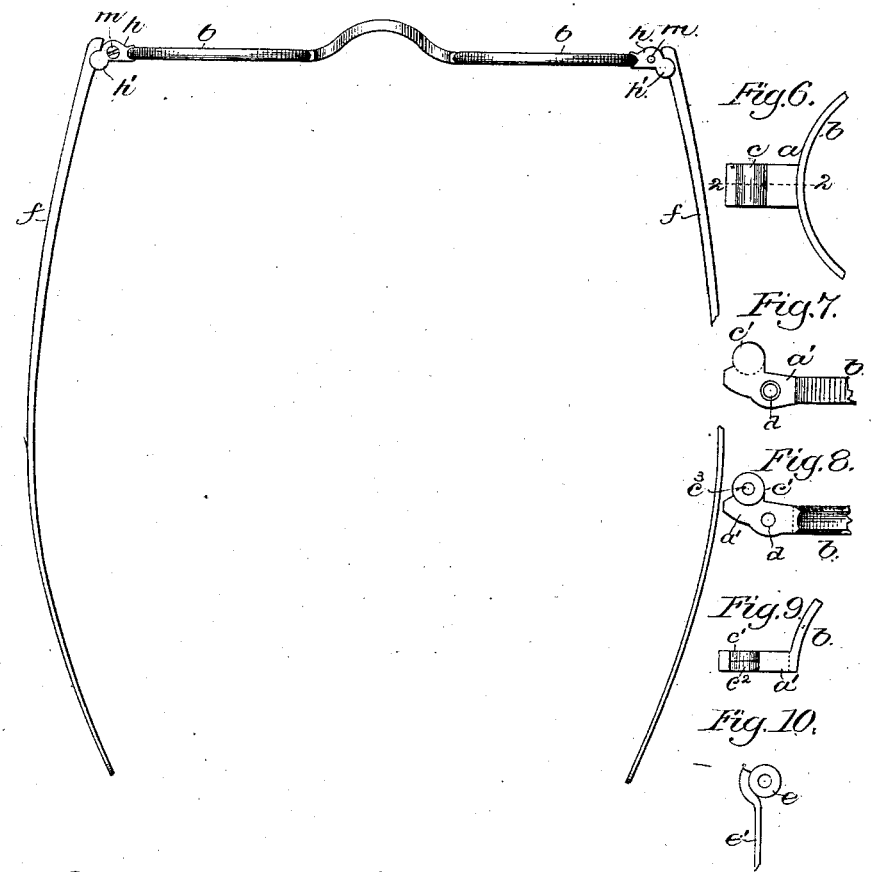
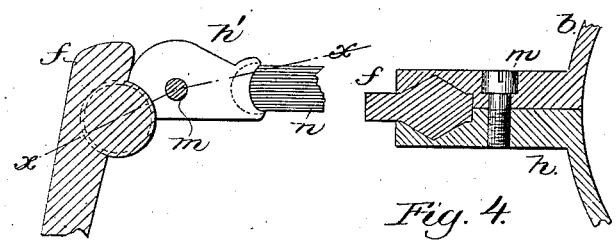
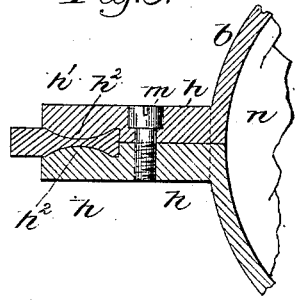
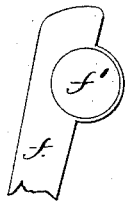
Witnesses.
Inventor.
Horace N. Carpenter.
By Crosby & Gregory
Attys.

United States Patent Office.

HORACE N. CARPENTER, OF SOUTHBRIDGE, MASSACHUSETTS, ASSIGNOR TO THE SOUTHBRIDGE OPTICAL COMPANY, OF SAME PLACE.

SPECTACLES.

SPECIFICATION forming part of Letters Patent No. 265,916, dated October 10, 1882.

Application filed July 24, 1882. (Model.)

*To all whom it may concern:*

Be it known that I, HORACE N. CARPENTER, of Southbridge, county of Worcester, State of Massachusetts, have invented an Improvement in Spectacles, of which the following description, in connection with the accompanying drawings, is a specification.

The object of my invention is to simplify and cheapen the construction of the joint connecting the temples with the bows or glass-holding portions of spectacles, and at the same time make such joints stronger and more durable and obviate the use of pivot-pins to wear and become loose.

In accordance with this invention I provide one end of each temple at each side with a countersunk or conical cavity, and each half of the end piece attached to the bow with conical projections to fit and extend into the said cavities, the halves of the end pieces attached to the bows being held and drawn together by a clamping-screw, such construction enabling me to do away with the usual pivot-pin inserted through the end pieces and temple, and upon which the latter as heretofore made have turned.

Figure 1 represents a pair of spectacles embodying my improvements; Fig. 2, an enlarged section of the joint which unites the temple and bow. Fig. 3 is a section of Fig. 2 on the dotted line $x\ x$. Fig. 4 is a detail of the upper end of the temple. Fig. 5 is a modification wherein the conical projections are on the temple instead of upon the parts of the joint attached to the bow, as in Fig. 3; and Figs. 6 to 10, details of the joint parts of spectacles as now commonly made.

I will first refer to the old style of spectacles to the better enable my invention to be understood.

As now commonly made a block, $a$, (see Fig. 6,) is soldered to the bow $b$, a piece of round hollow wire, $c$, is soldered to the block, the block is then drilled, as at $d$, and the wire and block are then sawed apart on the line 2 2 centrally, the saw cut also severing the bow. In this condition the two pieces $a'$, (see Figs. 7 to 9,) drilled as at $d$, and centrally shaped and threaded to receive the usual clamping-screw; and the inner side of the two parts made by sawing the hollow wire $c$, (they being marked $c'$ in Figs. 7 to 9,) are then milled away, as at $c^2$, Fig. 9, to form a suitable space for the reception of the ear $e$ of the temple $e'$, and the parts $c'$ are then drilled, as at $c^3$, Fig. 8, to receive the usual pivot-pin on which the temple turns. The temple $e'$ has an ear, $e$, soldered to it, (see Fig. 10,) which is drilled and milled to fit between the milled faces of the parts $c'$. The manufacture of spectacles in this way involves numerous soldering, milling, and drilling operations, each joint requiring three separate solderings, whereas by my invention I entirely dispense with the usual hollow joint-wire and the labor of soldering it to the end pieces and the temple, and the labor of finishing the same by milling, and I also, which is of the greatest importance, dispense with the pivot-pin, which in the old process forms the connection between the temple and the block or end piece connected with the bow, which pin is very liable to work loose and drop out, and also break.

In accordance with my invention I subject the joint end of the temple $f$ to the action of dies, which form at its opposite sides conical cavities $f'$, (see Fig. 4,) there being two such cavities, one at each side, shown in the section Fig. 3. To the bow $b$ at each end I solder two end pieces, $h$, each formed to shape by dies, and each having as part of it a downwardly-bent portion, $h'$, which at its inner face is provided with a conical projection, $h^2$, (see Fig. 3,) to enter the conical cavities $f'$, formed at the sides of the temple, and I draw or hold these two end pieces, $h'$, together by the clamping-screw $m$, the said conical projections entering the said cavities and serving to hold the temple so that it may turn thereon. As the joint formed between the contacting parts of the temple and the end pieces wears by use the inner faces of the end pieces may be dressed off and the screw $m$ turned, thus making a joint of the necessary closeness.

It is obvious that without departure from my invention I might form the conical projection on the temple and the cavities in the end pieces as in Fig. 5; but the plan shown in Figs. 1 and 3 is preferred as the cheapest and best. In Figs. 2 and 3 I have shown a piece of one of the eyeglasses, as $n$.

I claim—

As an improved article of manufacture, spectacles having the temples and end pieces provided with concavities and conical projections, as described, and held together by a clamping-screw, $m$, substantially as shown and described.

In testimony whereof I have signed my name to this specification in the presence of two subscribing witnesses.

HORACE N. CARPENTER.

Witnesses:
A. J. BARTHOLOMEW,
WM. C. BARNES.